United States Patent [19]
Bruno et al.

[11] Patent Number: 5,499,289
[45] Date of Patent: Mar. 12, 1996

[54] SYSTEMS, METHODS AND ARTICLES OF MANUFACTURE FOR PERFORMING DISTRIBUTED TELECOMMUNICATIONS

[75] Inventors: Richard F. Bruno, Morristown; Robert E. Markowitz, Glen Rock, both of N.J.

[73] Assignee: AT&T Corp., Murray Hill, N.J.

[21] Appl. No.: 350,290

[22] Filed: Dec. 6, 1994

[51] Int. Cl.$^6$ .................................................. H04M 7/00
[52] U.S. Cl. .......................... 379/220; 379/221; 379/269; 379/265
[58] Field of Search ............... 379/95, 88, 89, 379/91, 94, 97, 196, 207, 220, 265, 219, 221, 266, 269; 380/25, 49

[56] References Cited

U.S. PATENT DOCUMENTS

| | | | |
|---|---|---|---|
| 5,181,238 | 1/1993 | Medamana et al. | 379/88 |
| 5,375,167 | 12/1994 | Bales et al. | 379/219 |
| 5,386,417 | 1/1995 | Daugherty et al. | 379/269 |
| 5,392,345 | 2/1995 | Otto | 379/265 |
| 5,392,346 | 2/1995 | Hassler et al. | 379/265 |

*Primary Examiner*—Jeffery Hofsass
*Assistant Examiner*—Scott Wolinsky

[57] ABSTRACT

Disclosed are systems, methods and articles of manufacture for operating a single processing system node among a plurality of processing system nodes for performing distributed telecommunications. In particular, a first information data set is transferred from a first processing system node to a second processing system node via a first communications path. A second communications path is established between the first processing system node and a communications node. The second communications path is established as a function of at least a portion of the first information data set. The first and second communications paths operate to facilitate communications between the second processing system node and the communications node.

28 Claims, 3 Drawing Sheets

SYSTEMS, METHODS AND ARTICLES OF MANUFACTURE FOR PERFORMING DISTRIBUTED TELECOMMUNICATIONS

TECHNICAL FIELD OF THE INVENTION

The present invention relates in general to the field of telephony, and more particularly to systems, methods and articles of manufacture for performing distributed telecommunications.

BACKGROUND

Telecommunications is the process of controlling communication message transmission and reception, typically through the utilization of telephony devices and systems, wherein the communications occur over both short and long distances. Telemarketing is a subset of telecommunications. It involves the use of telephony devices and systems which may include the utilization of one or more processing systems as interactive mediums for promotion and/or promotion response.

Telemarketing systems used in promotion response provide inbound telecommunication services. This includes, for example, receiving orders, inquires, donation pledges, survey responses and customer complaints. Telemarketing systems used in outbound promotion provide outbound telecommunication services. This includes, for example, placing orders, customer follow-up requests, customer service and fund raising.

Conventional outbound telemarketing systems rely upon large calling centers and large numbers of outbound telemarketing agents to place calls. Processing system technologies have been integrated into many call centers enabling the telemarketing agents to work with a plurality of scripts developed for particular customers or customer types. The term script refers to a textual outline of the intended (reasonably anticipated) conversation between the caller and the party called with branched responses to enable the caller to acquire the desired information from the party called. The amount or level of scripting is typically application or implementation dependent.

Processing system technologies also are typically used to store a variety of calling lists from which the next call to be placed is selected. Many outbound calling centers have host based database processing systems which are utilized by the telemarketers. Many of these systems are known as Private Branch Exchange telecommunication systems ("PBX's"). These host systems typically operate to select the next party to call from one of the calling lists for a given calling campaign, allow scripting to be linked to the calling campaign, and instruct a PBX to out-dial the call.

The telecommunications industry, and the telemarketing industry in particular, is currently faced with a number of problems. In particular, real estate costs in many locales have become prohibitively high. Hardworking, talented and well trained workforces are difficult to assemble, and, even when assembled, suffer from high turnover rates which contribute to the exhaustion of the local labor pool. Of those who are available to work, many, such as the elderly and college students, require part-time employment and/or work that is close to home. They are, in many cases, unable to work out of traditional large central telecommunication centers.

One conventional solution to the labor problem incorporates a front-end voice-response system as part of the outbound calling technology. Such a system initiates the outbound call and interacts with the called party via the touch-tone pad of the called party's telephone. The called party is queried, and asked to hold while transferred to a telemarketing agent. Although this solution addresses the problem of reducing the number of local agents needed, it creates other problems in that it is obtrusive, often inconveniencing and/or annoying the called party who is forced to hold for a telemarketing agent. Such an approach has been criticized, especially by regulators and consumers, and its use often results in the transfer of abandoned calls to the telemarketing agents. A further problem associated with this approach is call load balancing among agents and across applications, which may become difficult to manage. It has also been proposed to allow telemarketing agents to work out of their homes by supplying the agents with calling lists. Although this solution avoids a number of the issues set forth above, the telemarketing companies no longer control their calling lists, an invaluable asset, and lack a reasonable means for supervising their calling agents.

SUMMARY OF THE INVENTION

In accordance with the principles of the present invention, systems, methods and articles of manufacture for performing distributed outbound telecommunications are provided. In particular, a distributed telecommunications system in accordance with the principles of the present invention, concerns both a plurality of processing system nodes and coupling means for establishing communication paths between ones of the nodes. Each one of the processing system nodes preferably includes means for receiving and processing at least one input data set to generate at least one output data set, and means for transmitting the output data set to one of a telephony device and at least one other of the plurality of processing system nodes. The telephony device is preferably responsive to the receiving and processing means and is operable to generate and monitor a calling signal. The coupling means operates to establish a communications path between selected ones of the plurality of processing system nodes whereby a first processing system node transmits a first output data set to a second processing system node, and the first processing system node directs the telephony device to generate a first calling signal as a function of at least a portion of the first output data set.

A first processing system node for use in a distributed telecommunications system in accordance with the principles of the present invention concerns the utilization of both communication and processing means. The communication means is operable to transfer one or more information data sets between the first processing system node and, at least one of a second processing system node and a communications node. The processing means, which includes at least one processing unit, is operable to transmit a first information data set to the second processing system node, and to provide a communications link between the second processing system node and the communication node as a function of at least a portion of the first information data set.

A method in accordance with the principles of the present invention concerns the performance of distributed telecommunications between a plurality of processing system nodes and at least one communications node wherein the plurality of processing system nodes and the communications node are selectively coupled via one or more communications paths. The method more particularly involves transferring a first information data set from a first processing system node to a second processing system node via a first communications path, and subsequently establishing a second communications path between the first processing system node and the communications node as a function of at least a portion of the first information data set. The first and second communications paths preferably facilitate communications between the second processing system node and the communications node.

One embodiment for using and/or distributing the present invention is as software stored to one or more storage mediums. Alternate embodiments include implementations in hardware and firmware. The software includes a plurality of processing system instructions for controlling at least one processing unit for performing distributed telecommunications. The storage mediums utilized may include, but are not limited to, magnetic, optical, and semiconductor chip. The storage medium includes a plurality of processing system instructions readable by one or more processing system nodes. The plurality of processing system instructions are operable to selectively control one or more processing units within ones of the processing system nodes. The plurality of processing system instructions include a plurality of instruction sets. A first instruction set is operable to transfer a first information data set from a first processing system node to a second processing system node via a first communications path. A second instruction set is operable to establish a second communications path between the first processing system node and a communications node as a function of at least a portion of the first information data set. The resultant first and second communications paths preferably facilitate communications between the second processing system node and the communications node.

BRIEF DESCRIPTION OF THE DRAWINGS

For a more complete understanding of the present invention, and the advantages thereof, reference is made to the following descriptions taken in conjunction with the accompanying drawings in which like numbers designate like parts, and in which.

DETAILED DESCRIPTION OF THE INVENTION

Figure 1:
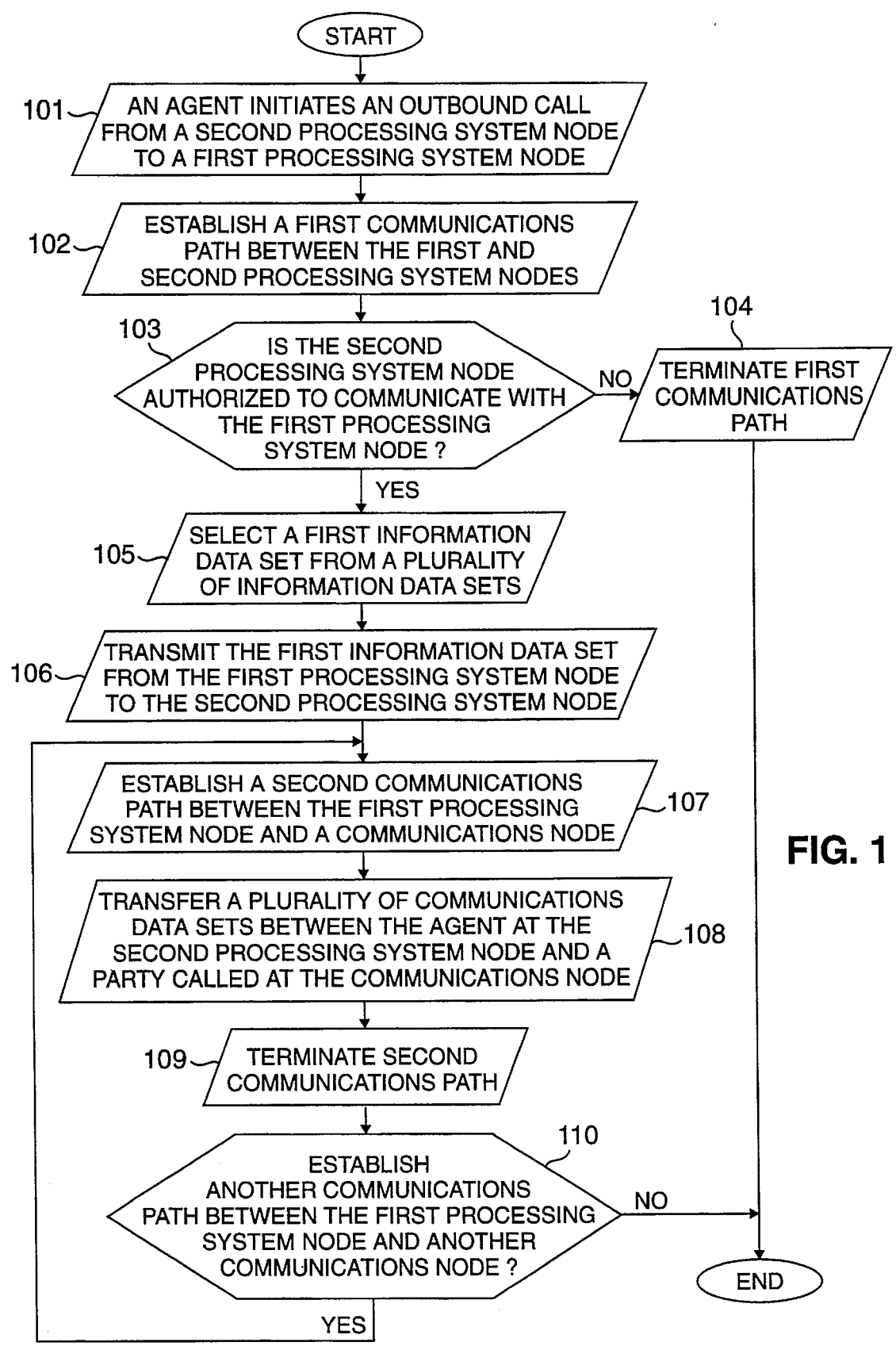
FIG. 1 illustrates a flow diagram of one preferred method for performing distributed telecommunications in accordance with the principles of the present invention.

FIG. 1 illustrates a flow diagram of one preferred method for performing distributed telecommunications in accordance with the principles of the present invention. The method begins upon entering the START block, whereupon an agent, in conjunction with a second processing system node, initiates an outbound call to a first processing system node, processing block 101. Preferably, the first and second processing system nodes are distributed, in other words, located relatively distant with respect to one another. Initiation of the outbound call is preferably accomplished by establishing a first communications path from the second processing system node to the first processing system node, processing block 102. The first communications path is preferably bi-directional and facilitates communications between the first and second processing system nodes.

A verification procedure is preferably undertaken to verify the authority of the second processing system node to communicate with the first processing system node, decisional block 103. In the event that the verification process determines that the second processing system node is not authorized, NO branch of decisional block 103, the first communications path is preferably terminated, processing block 104, and the process ends. Upon verification of the second processing system node's authority, YES branch of decisional block 103, the first processing system node preferably selects a first information data set from among a plurality of information data sets, processing block 105. The plurality of information data sets are preferably stored within a conventional storage device, such as a database, for example, which may be located internally or externally to the first processing system node.

In a preferred embodiment, the selection process is preferably performed as a function of at least one descriptor associated with the second processing system node. As will be discussed in detail with reference to FIG. 4, each processing system node has associated with it certain descriptors, such as an identification or name, for example. The descriptors may be passed from one processing system node to another during communications or attempted communications.

The first information data set typically includes one or more scripting data subsets. The first processing system node operates to transmit the first information data set and, optionally, a second information data set to the second processing system node. The second information data set, when used, preferably includes one or more data subsets which are individually or collectively associated with a communications node, processing block 106. Such data subsets may include information such as, for example, the name of a party to ask for at the communications node. The first and second information data sets may be combined to provide a textual representation of a scripted conversation, which may be utilized by the agent during conversations with one or more parties at the communication node.

Next, the first processing system node operates to establish a second communications path between the first processing system node and the communications node, processing block 107. The second communications path is preferably established as a function of at least a portion of the first information data set. The first and the second communications paths facilitate communications between the second processing system node and the communications node. The second processing system node and the communications node preferably begin transferring a plurality of communication data sets therebetween, processing block 108. Preferably, the data transfer is a function of the selectively combined first and second information data sets. One or more of the plurality of communication data sets are preferably representative of physical speech occurring at the second processing system node and/or the communications node, and generated by the agent and/or the called party, respectively.

Upon completion of the conversational data transfer between the second processing system node and the communications node, the second communications path is terminated, processing block 109. Preferably, a determination is made as to whether another communications path between the first processing system node and another communications node should be established, decisional block 110. If another path is to be established, YES branch of decisional block 110, the process preferably returns to block 107. Alternatively, the process ends, NO branch of decisional block 110.

In one preferred embodiment, a supervisor, utilizing the first processing system node is allowed to intercept and monitor communications between the second processing system node and the communications node. The supervisor may be an individual or another processing system, such processing systems being more fully discussed in conjunction with FIG. 2. The supervisor may be either closely or remotely located with respect to the first processing system node.

Figure 2:
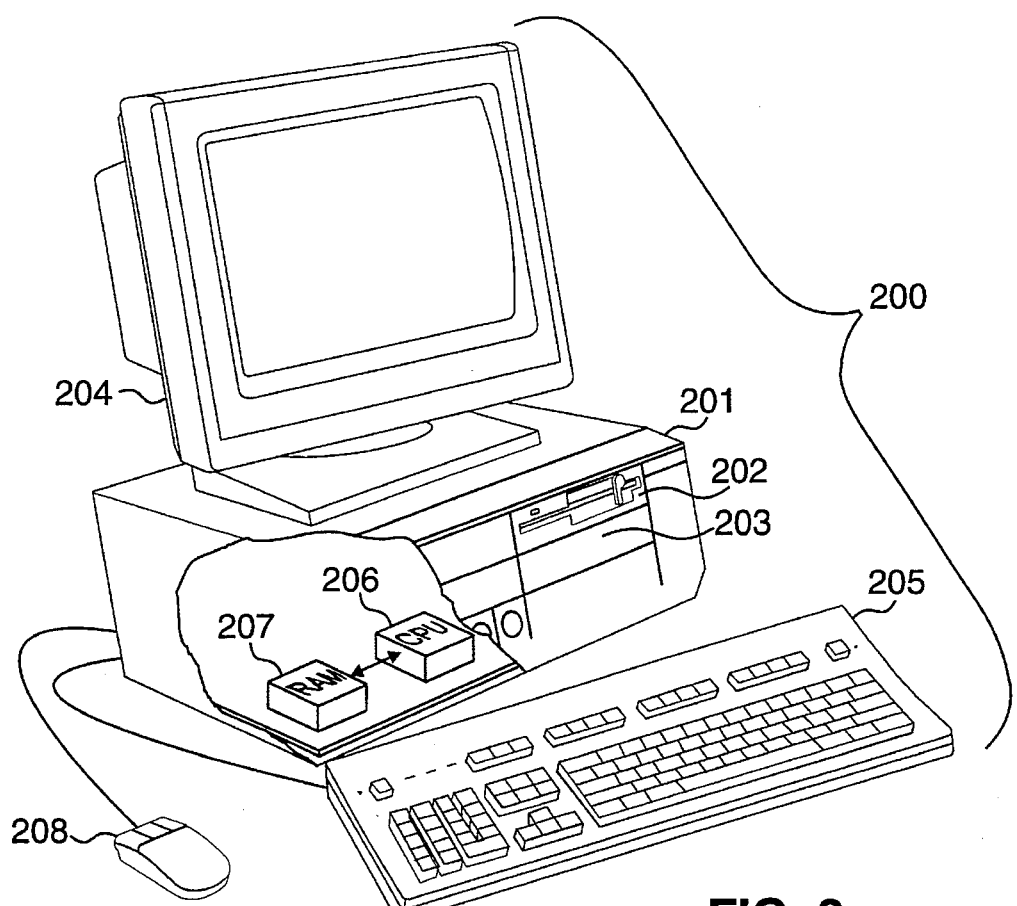
FIG. 2 illustrates an isometric view of a personal computer which may be programmed to operate as a processing system node in accordance with the principles of the present invention.

FIG. 2 illustrates an isometric view of a personal computer 200 which may be programmed to operate as a processing system node in accordance with the principles of the present invention. Personal computer 200 is comprised of a hardware casing 201 (illustrated having a cut-away view), a monitor 204, a keyboard 205 and a mouse 208. The monitor 204, and the keyboard 205 and mouse 208 may be replaced by, or combined with, other suitably arranged output and input devices, respectively. Personal computer 200 preferably includes conventional telephony device and system technologies (not shown), such as a modem and/or an ISDN board, as examples, for transmitting and receiving data sets and signals in accordance with the principles of the present invention.

Hardware casing 201 includes both a floppy disk drive 202 and a hard disk drive 203. Floppy disk drive 202 is operable to receive, read and write to external disks, and hard disk drive 203 is operable to provide fast access data storage and retrieval. Although only floppy disk drive 202 is illustrated, personal computer 200 may be equipped with any suitably arranged structure for receiving and transmitting data, including, for example, video conferencing and collaboration system and device technologies, tape and compact disc drives, and serial and parallel data ports. Illustrated within the cut away portion of hardware casing 201 is a processing unit 206, coupled with a memory storage device 207, which in the illustrated embodiment is a random access memory ("RAM"). Although personal computer 200 is shown having a single processing unit 206, personal computer 200 may be equipped with a plurality of processing units 206 operable to carry out cooperatively the principles of the present invention. Similarly, although personal computer 200 is shown having the single hard disk drive 203 and memory storage device 207, personal computer 200 may be equipped with any suitably arranged memory storage device, or plurality thereof. Further, although personal computer 200 is utilized to illustrate a single embodiment of a processing system node, any processing system having at least one processing unit which operates in conjunction with suitably arranged telephony device and service technologies, including, for example, sophisticated calculators and hand held, mini, main frame and super computers, including RISC and parallel processing architectures, as well as processing system network combinations of the foregoing, may be utilized as a processing system node in accordance with the principles of the present invention.

Figure 3:
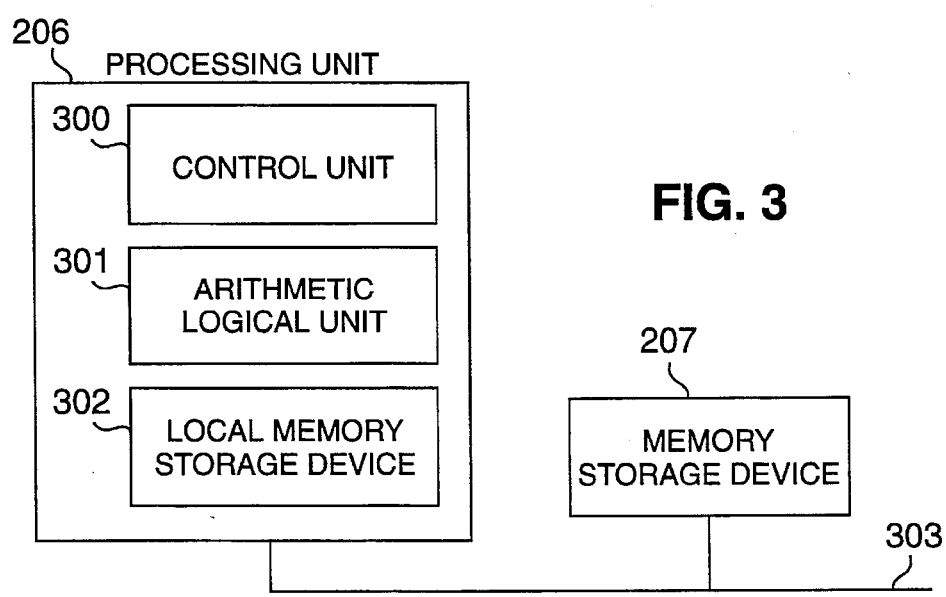
FIG. 3 illustrates a block diagram of one microprocessing system which may be utilized in conjunction with the illustrative processing system node shown in FIG. 2.

FIG. 3 illustrates a block diagram of one microprocessing system which may be utilized in conjunction with personal computer 200. The illustrative microprocessing system includes a single processing unit 206 coupled via data bus 303 with a single memory storage device 207, such as the RAM illustrated in FIG. 2, for example. Memory storage device 207 is operable to store one or more processing system instructions. Processing unit 206 is operable to retrieve, interpret and execute the instructions. Illustrative processing unit 206 includes a control unit 300, an arithmetic logic unit ("ALU") 301, and a local memory storage device 302, such as, for example, stackable cache or a plurality of registers. Control unit 300 is operable to fetch processing system instructions from memory storage device 207. ALU 301 is operable to perform a plurality of operations, including addition and Boolean AND needed to carry out instructions. Local memory storage device 302 is operable to provide local high speed storage used for storing temporary results and control information.

Figure 4:
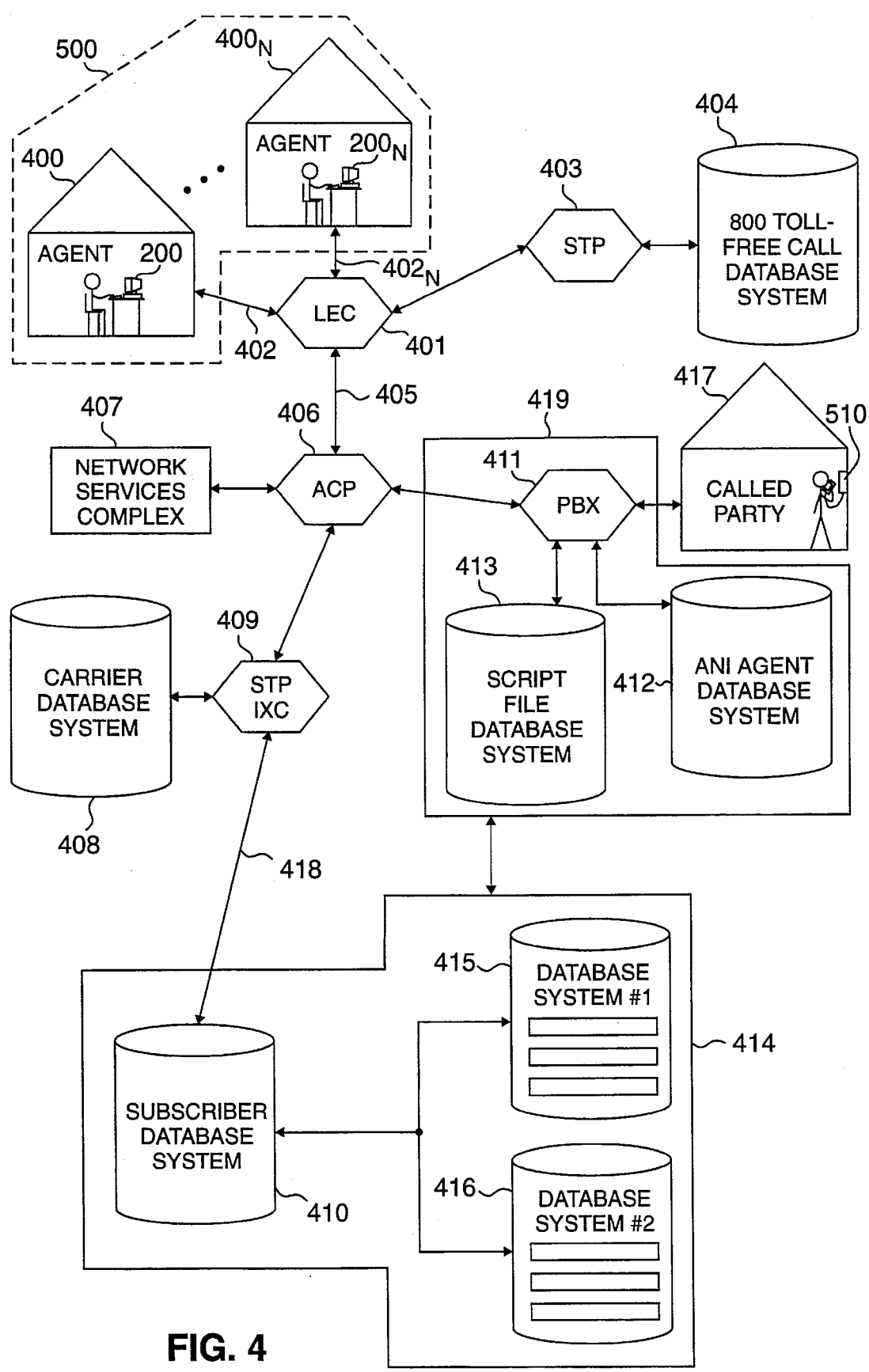
FIG. 4 illustrates a block diagram of one preferred distributed outbound telecommunications routing system in accordance with the principles of the present invention wherein a telephone call is routed from a telemarketing agent to a called party.

FIG. 4 illustrates a block diagram of a distributed telecommunications routing system for enabling a telephone call to be routed from a plurality of telemarketing agents 400 through $400_N$ located at a plurality of distributed agent operated processing system nodes (collectively) 500 to a particular called party 417 in accordance with the principles of the present invention. The illustrative embodiment is premised upon an 800 toll free call being placed by agent 400, preferably utilizing an ISDN-BRI line 402, the principles for utilizing such technologies being known. The use of the 800 toll free call is illustrative only, as the principles of the present invention may be implemented in accordance with any intelligent call processing technology, including videophone, or any other suitably arranged communications technologies, such as 900 toll calls, as another example. ISDN-BRI line 402 is a single 2/4 wire circuit multiplexed to 2B+D, wherein B is a bearer channel preferably carrying 64 Kbps of voice or digital data, and preferably supporting a Q.931 ISDN protocol for x.25 messaging.

Agent 400 is illustrated utilizing a processing system, such as personal computer 200, at home or another extended, or distributed, location. Personal computer 200 is preferably connected to ISDN-BRI line 402 via conventional telephony device and service technology. Agent 400 launches a digital services data call over line 402 by dialing the 800 number associated with a particular outbound telecommunications service. The data call travels over line 402 to a local exchange carrier ("LEC") 401. The data call, as is common with other intelligent call processing technologies, has a plurality of descriptors associated with it. Descriptors are common to both voice and data calls and are used for a plurality of purposes, including use by routing methodologies, as is more fully described in U.S. Pat. No. 4,191,860, entitled "Data Base Communication Call Processing Method", which is commonly owned by the assignee of the present invention and which is incorporated herein by reference. LEC 401 operates to recognize the data call as an 800 toll free call and in response to such recognition, queries an 800 toll free call database system 404 utilizing a signal transfer point ("STP") 403. STP 403 more particularly is a point of interconnection, preferably a SS-7 signaling network connected by quad-D channels. Database system 404 preferably operates to identify the data call as belonging to a particular network carrier.

LEC 401 switches the data call to the particular network carrier identified, preferably utilizing bearer capability routing. Bearer capability routing more particularly uses the bearer field in a Q.931 ISDN protocol setup message as a routing element and allows calls to the same 800 number to be routed to different destinations based on descriptors, such as by type and speed of call, for example. LEC 401 routes the data call on Feature Group-D data trunk 405 as the data call originated as a digital services call. Feature Group-D data trunk 405 more particularly is a service and feature level provided by LEC 401 on these interconnect trunks, in other words, an interconnect trunk that operates to carry only data communications traffic.

The data call travels over trunk 405 to an originating screening office/action point ("ACP") 406 which preferably operates as a switching mechanism. ACP 406 receives the data call in the following preferred format, namely, ANI code or telephone number billed, the 800 number dialed by agent 400, as well as other descriptors particular to the implementation. ACP 406 is preferably connected with a network services complex 407.

Network services complex 407 is preferably operable to query callers, presently agent 400, and require responsive data input. This may be accomplished utilizing the touch-tone keypad on the caller's telephone. The input data, which may be used by routing mechanisms, is preferably utilized to provide login security measures to ensure limited access. A conventional technique for querying, gathering and forwarding telephony input data is more fully described in U.S. Pat. No. 4,611,094, entitled "Method for Customer Definable Telephone Capability", which is commonly owned by the assignee of the present invention and which is incorporated herein by reference. Agent 400 preferably responds to one or more of the prompts by inputting caller entered data, such as, a predetermined login code, such as "3210", for example. Network services complex 407 forwards all of the information gathered during the information collection process to ACP 406, which, in turn, forwards the information to a carrier database system 408 through a signaling transfer point ("STP IXC") 409. The carrier database system 408 preferably forwards the 800 number dialed, ANI code, and the forwarded telephony input data through STP IXC 409 to a subscriber database system 410. Subscriber database system 410 may be internal or external to the carrier network, but is preferably located in the illustrated embodiment within an outbound telecommunications application 414.

A preferred method and system for processing a database queried call, utilizing the call processing capabilities of a carrier database system and a subscriber database system as part of a total communications system, as well as the routing and processing labels for the carrier database and the subscriber database systems, are more fully described in U.S. Pat. No. 5,311,572, entitled "Cooperative Database Call Processing System", which is commonly owned by the assignee of the present invention and which is incorporated herein by reference.

The subscriber database system 410 is preferably linked to the carrier database system 408 through STP IXC 409 via conventional telephony device and service technology, such as, Frame Relay Service, ATM or private line, as examples. Correct responses to network services complex 407 queries effectively destination routes agent 400's call back through ACP 406 to PBX switch 411 located within an outbound calling application system processing node 419. ACP 406 and PBX 411 are preferably coupled via conventional telephony device and system technologies. The outbound calling application system processing node 419 preferably includes PBX 411, an ANI agent database system 412 and a script file database system 411.

A determination is made as to agent 400's authority to use the prescribed ANI code utilizing ANI agent database system 412, which is more fully described in U.S. Pat. No. 5,003,595, entitled "Secure Dial Access to Computer Systems" which is commonly owned by the assignee of the present invention and which is incorporated herein by reference. If agent 400's use of the ANI code is authorized, agent 400 is connected to script file database system 413, which is associated with agent 400's ANI code, from which a pre-assigned script is retrieved. Alternatively, a preassigned script type may be chosen with the day's information to be filled in from another database system or database file. The script may include decision questions, text of dialog, and/or data elements required to be answered, for example. Script file database system 413 downloads the script to agent 400's processing system 200 via PBX 411, ACP 406, trunk 405, LEC 401 and ISDN-BRI line 402.

The script file database system 413 preferably updates an internal outbound agent list, or other similar recording means, possibly with information agent 400 has entered, such as the login code, for example, to indicate the downloading of the script file. If agent 400 has not correctly responded to the login requests, in other words, carrier database system 408 has failed to find a match within its caller entered digits database files, agent 400's call is preferably terminated and, hence, a script is not downloaded.

Once the script has been downloaded, agent 400 begins the outbound calling process. This is preferably accomplished by either transferring agent 400 to an outbound control unit or having agent 400 disconnect and reacquire access to a separate or distinct part of the outbound system, as examples. The outbound calling process, regardless of how control is transferred, preferably utilizes LEC 401 to transfer agent 400 to an appropriate network carrier in accordance with the illustrative embodiment. This portion of the 800 toll-free call may be processed as either a voice or data call, causing LEC 401 to route the call to the proper network carrier via ACP 406 on Feature Group-D voice or data trunk 405.

Network services complex 407 may again request that agent 400 input caller entered data, in other words, login. If agent 400 is required and fails to login correctly, the call is preferably terminated. If agent 400 is authorized, the call is routed to subscriber database system 410 via STP IXC 409.

Subscriber database system 410 is preferably coupled with a plurality of databases 415, 416 containing calling lists. The calling lists preferably include without limitation information pertaining to a called party's name and telephone number. Other information, for example, may consist of the called party's address, size of family, the occupation of the head of the household, etc. Agent 400 may access the calling lists through the outbound telecommunications application 414. Agent 400's access to particular databases and/or database systems is preferably predetermined by agent 400's identity and/or the agent type to which agent 400 is assigned. This may be determined by the ANI code/caller entered digits. A telemarketing database identification response message preferably identifies the specific calling list which agent 400 is to access.

When agent 400 is linked to subscriber database system 410, a database query is preferably undertaken to determine if a match exists between agent 400 information, such as, for example, the 800 toll-free call dialed, the ANI code, agent 400's type and/or agent 400's login information, and data resident to subscriber database system 410. If the database query fails to find a match, agent 400 is denied access and the call is preferably terminated. If a match is determined, agent 400 is authorized to use the outbound calling system. The outbound telecommunications application 414 preferably generates a telemarketing database identification response message which is sent to outbound calling system processing node 419. If agent 400 is authorized to use the outbound calling system and the particular calling database systems 415, 416 has been determined, the telephone number of the next party to be called in the specific calling database systems 415, 416 is determined using subscriber database system 410. For agent 400 to know the name, as well as other demographic information to properly greet the called party 417, a call set-up message ("ISUP") is preferably launched to agent 400 from PBX 411 in outbound call system 419 with information provided by subscriber database system 410. ISUP passes through STP 409, ACP 406, and LEC 401 to agent 400's personal computer 200.

In one preferred embodiment, agent 400's personal computer 200 operates to perform a database matchup of the ANI code associated with the number from which the ISUP originated, against a look-up table resident to agent 400's personal computer 200. Utilization of a lookup table is used to accept or reject the call based upon an ANI match within its database. This look-up table contains the ANI codes associated with originating ISUP of the outbound telecommunications application 414. When the database match-up is undertaken, if a match occurs between the ANI code from which the ISUP originates and the lookup table, a local application resident within personal computer 200 rejects the call and a rejection acknowledgment is sent back to outbound application 414. In turn, the ISUP is captured by the local application and populates agent 400's personal computer screen with call set-up information. Agent 400 is provided with information about the next person to be phoned. The set-up information, typically of size 56 Kb to 256 Kb, includes information regarding the next call to be launched by outbound application 414 through PBX 411, such as, for example, name, telephone number, etc. Either agent 400 or the application resident to personal computer 200 acknowledges receipt of the call setup information.

If a call other than that associated with outbound application 414 is received by personal computer 200, the resident application will still perform a lookup of the call setup information. The resident application will have found that the ANI would not have matched any entry in the resident database and would accordingly have sent an acceptance acknowledgment message, thereby sending the call through to agent 400, such as through a conventional "call-waiting" arrangement, for example. The call therefore did not originate from the PBX 411 and was a regular phone call for agent 400. Preferably, this sequence would originate on a second bearer channel of the ISDN-BRI line 402, wherein the first bearer channel contains the originating call to the 800-number in the illustrated outbound application.

Outbound telecommunications application 414 by not responding immediately to the request by network services complex 407 for routing instructions pauses the call processing. Call processing remains paused at network services complex 407 while ISUP is sent to agent 400's personal computer 200 by outbound system 419. When the receipt of the call setup information is acknowledged at outbound application 414, it supplies routing information to network services complex 407 which launches the call to the next called party 417 associated with a communications node, such as a phone 510. This is preferably accomplished utilizing a 4ESS, which more particularly is a conventional digital communications switch capable of processing hundreds of thousands of call attempts per hour. Agent 400's call is extended through 4ESS, preferably causing agent 400 to hear the ringing of the call launched. When called party 417 answers, agent 400 knows the party to ask for from the information appearing upon processing system 200's screen.

As the call progresses, the outbound calling application preferably populates agent 400's screen with updated scripting as appropriate. When agent 400 has completed the call, the outbound calling system is updated to reflect the current status. Agent 400 hangs up (or terminates the call), and if the calling list has not been exhausted, repeats the outbound calling process. In the event the outbound calling list is exhausted, agent 400 may re-access calling list database systems 415, 416 as previously described.

In a still further embodiment, outbound application 414, or some other monitor processing means, will track the calls remaining on agent 400's calling list, and upon exhaustion or utilization beyond a particular threshold, will re-populate the calling list.

In one preferred embodiment, agent 400's supervisor is permitted, while agent 400 communicates with called party 417, to monitor the call. The supervisor, in accordance with the illustrated embodiment, dials into PBX 411 and, preferably, touch-tones an access code and the code associated with agent 400. PBX 400 creates a 3-way connection between agent 400, the called party and the supervisor, who proceeds to monitor the call in progress.

As previously indicated, although the illustrative embodiment utilizes an 800 toll free calling system, any suitably arranged intelligent call processing methodology may be utilized in place of or in conjunction with the calling system disclosed herein. For example, the call set-up message can be sent as an X.25 packet to agent 400's screen through an IXC packet network having an X.75 gateway to send network call record information as an X.25 message passed over a D channel of the BRI line or any public or private packet network. In another alternate embodiment, a standard telecommunications line rather than an ISDN-BRI line can be used, where caller identification may be used as a mechanism to deliver the name of the next caller.

Although the present invention and its advantages have been described in detail, it should be understood that various changes, substitutions and alterations can be made herein without departing from the spirit and scope of the invention.

We claim:

1. A distributed telecommunications system for facilitating telemarketing utilizing remotely located telemarketing agents while maintaining central control of a calling list comprising:

a network services complex for receiving a call originated by an agent operated processing system node and generating a query for routing instructions responsive to the call;

a subscriber database system connected in a network with the network services complex, the subscriber database system storing data sets which collectively comprise the calling list, and in response to said query for routing instructions producing an output of a particular data set identifying a next party to be called;

an outbound calling application system processing node connected in the network with the subscriber database system and the network services complex for receiving the particular data set from the subscriber database system, for calling the agent operated processing system node and transferring the data set, and for notifying the network services complex that the data set has been transferred to the agent operated processing node;

wherein the network services complex operates to initiate connection of the agent operated processing node with a communications node identified by the data set for the next party to be called.

2. The system of claim 1 wherein the agent operated processing system node includes memory means for storing a plurality of processing system operating instructions.

3. The system of claim 1 further including verification means for verifying whether an agent is authorized to use the system to receive the particular data set.

4. The system of claim 1 further including means for selecting the particular data set from a plurality of information data sets as a function of at least one descriptor associated with said agent operated processing system node.

5. The system of claim 1 further comprising a plurality of agent operated processing system nodes.

6. The system of claim 1 wherein the data sets stored in the subscriber database system fall into at least two categories, a first information data set including telemarketing script data and a second party identifying data set including party identifying information comprising at least one of the party's name, telephone number, address and size of family.

7. The system of claim 1 further comprising a supervisor processing system node for allowing a supervisor to interrupt and monitor communications between the agent and the party.

8. The system of claim 1 wherein the agent operated processing system node further comprises a computer including a local application resident in the computer for rejecting a call and providing a rejection acknowledgement to said outbound calling application processing node, and the outbound calling application processing node further comprises means to detect the rejection acknowledgement and operates to transfer the data set and to notify the network services complex that the data set has been transferred based upon detection of the rejection acknowledgement.

9. The system of claim 1 wherein the outbound calling application system processing node further comprises means for storing telemarketing script data.

10. The system of claim 9 wherein the outbound calling application system processing node further comprises means for matching an appropriate telemarketing script to the agent processing system node and the next party to be called.

11. A method for facilitating telemarketing utilizing remotely located telemarketing agents while maintaining central control of a calling list comprising the steps of:

receiving a call from an agent operated processing system node by a network services complex;

generating at the network services complex a query for routing instructions responsive to the call;

connecting the query to a subscriber database system which stores data sets which collectively comprise the calling list;

producing an output of a particular data set identifying the next party to be called from the calling list in response to the query;

receiving the particular data set in a communications system processing node;

calling the agent operated processing system node;

transferring the data set to the agent operated processing system node;

notifying the network services complex that the data set has been transferred to the agent operated processing node; and initiating the connection of the agent operated processing node with a communications node identified by the data set for the next party to be called.

12. The method of claim 11 further comprising the step of making a marketing pitch to the next party utilizing information from the data set for said party.

13. The method of claim 11 further comprising the step of transferring a telemarketing script to the agent operated processing system node.

14. The method of claim 11 further comprising the step of verifying that the agent is an authorized system user.

15. The method of claim 11 further comprising the step of providing a rejection acknowledgment subsequent to said step of calling the agent operated processing system node.

16. The method of claim 15 further comprising the step of detecting the rejection acknowledgment prior to said step of notifying the network service complex.

17. The method of claim 11 further comprising the step of terminating the connection between the agent and the party upon completing of the call.

18. The method of claim 11 further comprising the step of monitoring communications between the agent and the party.

19. The method of claim 11 wherein the step of producing an output of a particular data set is performed at an outbound calling application processing node and the method further comprises the step of utilizing the outbound calling application node to monitor communications between the agent operated processing system node and the communications system processing node.

20. The method of claim 11 wherein the call is a toll free call.

21. The method of claim 11 wherein the call is an 800 toll free call.

22. The method of claim 11 further comprising the step of identifying the call as belonging to a particular network carrier.

23. The method of claim 22 further comprising the step of routing the call based upon the results of said step of identifying the call.

24. The method of claim 11 further comprising the step of querying the originator of the call and requiring responsive data to be input before authorizing further call processing.

25. The method of claim 24 further comprising the step of inputting a caller identifying login code.

26. A method for facilitating telemarketing comprising the steps of:

receiving a call placed to a toll free number from an agent operated processing system node;

connecting the call to a network services complex;

querying a subscriber database for routing instructions;

transferring a data set including a phone number from the subscriber database to an outbound communications application processing node;

initiating a call to the agent operated processing system node from the automated communications application processing node;

transferring the data set from the outbound communications application processing node to the agent operated processing system node;

rejecting the call from the outbound communications application processing node but capturing the data set at the agent operated processing system node;

receiving the rejection message at the outbound communications application processing system node and notifying the subscriber database;

communicating from the subscriber database to the network service complex that a call should be routed to the phone number included in the data set; and initiating the connection of the agent operated processing system to a communications node associated with the phone number.

27. The method of claim 26 further comprising the step of transferring a script data set from the outbound communications application node to the agent operated processing system node.

28. The method of claim 27 further comprising the step of utilizing other information from the data set to make a sales pitch to a called party at the communications node.

* * * * *